United States Patent [19]

Seguela et al.

[11] Patent Number: 5,250,628

[45] Date of Patent: Oct. 5, 1993

[54] THERMOPLASTIC COMPOSITIONS WITH ELASTIC MEMORY AND A PROCESS FOR THEIR PREPARATION

[75] Inventors: Brigitte M. Seguela, Hinges; Patrick Kaifasz, Lens, both of France

[73] Assignee: Elf Atochem S.A., Paris-La Defense, France

[21] Appl. No.: 13,553

[22] Filed: Feb. 4, 1993

Related U.S. Application Data

[63] Continuation of Ser. No. 691,019, Sep. 16, 1991, abandoned, filed as PCT/FR90/00812, Nov. 14, 1990.

[30] Foreign Application Priority Data

Nov. 16, 1989 [FR] France .................. 89 15057

[51] Int. Cl.$^5$ .................. C08L 23/08; C08L 23/16; C08L 45/00
[52] U.S. Cl. .................. 525/210; 524/518; 525/193; 525/194
[58] Field of Search .................. 525/210

[56] References Cited

U.S. PATENT DOCUMENTS

| | | | |
|---|---|---|---|
| 3,676,390 | 7/1972 | Vergne et al. | 524/425 |
| 4,203,884 | 5/1980 | Coran et al. | 525/210 |
| 4,277,578 | 7/1981 | Yoshimura et al. | 525/211 |
| 4,302,557 | 11/1981 | Yoshimura et al. | 525/211 |
| 4,336,212 | 6/1982 | Yoshimura et al. | 264/22 |
| 4,336,350 | 6/1982 | Yoshimura et al. | 525/211 |
| 4,379,888 | 4/1983 | Yoshimura et al. | 525/211 |
| 4,454,303 | 6/1984 | Yoshimura et al. | 525/211 |
| 4,481,334 | 11/1984 | Yoshimura et al. | 525/211 |
| 4,499,241 | 2/1985 | Yoshimura et al. | 525/211 |
| 4,537,935 | 8/1985 | Yoshimura et al. | 525/222 |
| 4,542,886 | 9/1985 | Yoshimura et al. | 264/22 |
| 4,701,496 | 10/1987 | Yoshimura et al. | 525/240 |
| 4,835,218 | 5/1989 | Yoshimura et al. | 525/98 |
| 4,992,511 | 2/1991 | Yamamoto et al. | 525/210 |
| 5,104,940 | 4/1992 | Hert et al. | 525/210 |

FOREIGN PATENT DOCUMENTS

| | | |
|---|---|---|
| 0018751 | 11/1980 | European Pat. Off. |
| 2405972 | 5/1979 | France . |
| 63-130653 | 6/1988 | Japan . |
| WO90/12844 | 1/1990 | PCT Int'l Appl. |
| 2162526 | 2/1986 | United Kingdom . |

*Primary Examiner*—Carman J. Seccuro, Jr.
*Attorney, Agent, or Firm*—Finnegan, Henderson, Farabow, Garrett & Dunner

[57] ABSTRACT

This thermoplastic composition with elastic memory comprises a mixture of about 5-20 parts by weight of polynorbornene which may be crosslinked, about 80-95 parts by weight of at least one polyolefin and an amount of plasticiser for polynorbornene sufficient for reducing its glass transition temperature down to the range of rubbers.

According to the invention, the polyolefin chosen is a composition comprising 80 to 100% of at least one copolymer made of ethylene and at least one α-olefin chosen from propylene and 1-butene, said copolymer having a relative density between 0.850 and 0.890 and a flow index between 0.3 and 15 dg/min, and 0 to 20% of at least one polypropylene polymer.

Applications: Air-tight seals, footwear parts, flexible tubes, damping elements, profiles for the construction and automobile industries, and the like.

14 Claims, No Drawings

THERMOPLASTIC COMPOSITIONS WITH ELASTIC MEMORY AND A PROCESS FOR THEIR PREPARATION

This application is a continuation of Ser. No. 07/691,019, filed Sep. 16, 1991, now abandoned, which is a continuation of International patent application PCT/FR90/00812, filed on Nov. 14, 1990.

The present invention relates to new thermoplastic compositions with elastic memory based on polyolefins and to a process for their preparation.

Copolymers made of ethylene and at least one alpha-olefin having 3 to 8 carbon atoms and in some cases having weak residual crystallinity and a relative density between about 0.850 and 0.890 are already known and can be prepared by various processes. These products are distinguished by a balance of mechanical properties (elongation at break, compression and elongation set, Shore hardness) which represents an insufficient elastic memory for a certain number of potential applications of these products, such as air-tight seals, footwear parts, flexible tubes, damping elements, profiles for the construction and automobile industries, and the like.

The problem which the present invention aims to solve this consists in modifying ethylene/alphaolefin copolymers of this type with a view to obtaining a balance of mechanical properties which gives them a good elastic memory, making them usable for the abovementioned applications. More specifically, the change in the balance of mechanical properties intended to be achieved consists in:
increasing the elongation at break,
decreasing the elongation and compression set, and
decreasing the Shore hardness.

Even more specifically, the balance of mechanical properties to be achieved is as follows:
an elongation at break of at least about 600%,
a 100% elongation set not exceeding about 32%,
a compression set after 72 hours at 70° C. not exceeding about 80%, and
a Shore A hardness not exceeding about 78.

The present invention consists in combining an ethylene/α-olefin copolymer having a relative density between about 0.850 and 0.890 with a system comprising at least one other thermoplastic polymer of high molecular weight.

The polymers of relatively high molecular weight are in general incompatible with one another. When two polymers of different nature are mixed, the mixture has in general mediocre mechanical properties, such as tensile strength and elongation at break. A pair of polymers is rarely sufficiently compatible for forming a mixture having mechanical properties which are as good as those of the one of poorer performance. However, when two polymers are compatible, the resulting mixture can show an interesting combination of properties, i.e., apart from good mechanical properties, it can likewise have other favorable characteristics.

Thus, U.S. Pat. No. 4,203,884 teaches that compositions comprising a mixture of a crystalline thermoplastic polyolefin, polynorbornene and an amount of plasticiser for polynorbornene which is sufficient for reducing its glass transition temperature down to the range of rubbers have interesting properties. More particularly, this document discloses compositions comprising a mixture of 75 to 10 parts by weight of polyolefin, 25 to 90 parts by weight of polynorbornene and 30 to 400 parts by weight of plasticiser per 100 parts by weight of polynorbornene, said compositions being elastoplastic, i.e. they have elastomeric properties while, at the same time, being processible like a thermoplastic. In the molten state, a portion of the plasticiser can be present, according to this technique, in the thermoplastic polyolefin phase. After cooling, the plasticiser substantially migrates from the crystalline polyolefin phase to the polynorbornene phase to form part of the latter. In this manner, the plasticiser improves the thermoplasticity or the applicability of the composition. As a general rule, for a given degree of thermoplasticity, the higher the amount of plasticiser the less polyolefin required for the composition.

U.S. Pat. No. 4,203,884 also discloses compositions comprising a mixture of 10 to 90 parts by weight of crystalline polyolefin and 90 to 10 part by weight of crosslinked polynorbornene dispersed in the form of small-sized particles, and an amount of plasticiser sufficient for reducing the glass transition temperature of the polynorbornene down to the range of rubbers. Thus, the crosslinking of the polynorbornene improves the balance of properties of the composition, in particular tensile strength, resistance to solvents and high-temperature properties. Compositions of this type are obtained by a dynamic vulcanisation process, according to which a mixture of polynorbornene, plasticiser, polyolefin and crosslinking agents is kneaded at a temperature sufficient for crosslinking the polynorbornene.

Of the crystalline thermoplastic polyolefins usable according to U.S. Pat. No. 4,203,884, polyethylene and propylene may be mentioned, the latter being preferred as confirmed by the comparison of results shown in Tables 1 and 2 of the document cited. In particular, this document describes a composition comprising 30 parts by weight of crosslinked polynorbornene and 70 parts by weight of a polyethylene of density 0.960 g/cm$^3$, said composition having an elongation at break of 170% and an elongation set equal to 39%. Likewise it describes a composition comprising 10 parts by weight of crosslinked polynorbornene and 90 parts by weight of polypropylene having a Shore D hardness equal to 63, an elongation at break of 390% and an elongation set equal to 57%.

The present invention first relates to a thermoplastic composition with elastic memory comprising a mixture of about 5 to 20 parts by weight of polynorbornene, about 80 to 95 parts by weight of at least one polyolefin and an amount of plasticiser for polynorbornene sufficient for reducing its glass transition temperature down to the range of rubbers, characterised in that the polyolefin chosen is a composition comprising:
80 to 100% of at least one copolymer made of ethylene and at least one alpha-olefin chosen from propylene and 1-butene, said copolymer having a density between about 0.850 and 0.890 and a flow index between about 0.3 and 15 dg/min, and
0 to 20% of at least one propylene polymer.

Copolymers made of ethylene and alpha-olefin and representing the major component of the polyolefin composition which is part of the thermoplastic composition having elastic memory according to the invention are wellknown to one skilled in the art and can be prepared by various processes.

Thus, a first group of polyolefin rubbers marketed by MONTEDISON under the name DUTRAL® and consisting of copolymers composed of 65 to 80 mol % of ethylene and 20 to 35 mol % of propylene and having a relative density of 0.850 to 0.870, having no residual crystallinity whatever and thus no crystalline melting temperature, and having a geometric average molecular weight of 90 to 100 kg/mol and a polydispersity index between 2.2 and 2.9, is known. Likewise, a second group of polyolefin rubbers marketed by MITSUI under the name TAFMER ® and consisting of copolymers composed of 78 to 92 mol % of ethylene and 8 to 22 mol % of an alpha-olefin chosen from propylene and 1-butene, which have a relative density of 0.860 to 0.890 and a degree of residual crystallinity of 1 to 14%, a crystalline melting temperature J of 75° C. and having a geometric average molecular weight of 60 to 120 kg/mole and a polydispersity index between 2.2 and 2.7, is known.

Finally, it is also possible to choose a polyolefin rubber consisting of an ethylene/propylene and/or 1-butene copolymer, which has a flow index between about 0.3 and 15 dg/min and a relative density between about 0.865 and 0.885 and which comprises 77 to 91 mol % of units derived from ethylene and 9 to 23 mol % of units derived from propylene and/or 1-butene, and is characterised by a crystalline melting temperature J between about 100° and 125° C. Such a rubber can additionally be characterised by at least one of the following elements:

- a polydispersity index between about 3.5 and 15, preferably between about 4 and 8,
- a geometric average molecular weight (defined as below) between about 35 and 70 kg/mole,
- a relationship between the relative density d and the content x (expressed in mol %) of units derived from propylene and 1-butene expressed by the double equation:

$$0.9085 \leq d + 0.002x \leq 0.918$$

- a degree of residual crystallinity (determined by the method described below) between about 3 and 15%.

In the context of the present invention, the crystalline melting temperature J is understood to mean the temperature determined at the melting curve maximum after crystallization obtained by subjecting the copolymer sample to a process consisting of the following three steps:

melting at a rate of 8° C. per minute from 10° C. to 150° C., then crystallizing at a rate of 8° C. per minute from 150° C. to 10° C., then again melting at a rate of 8° C. per minute from 10° C. to 150° C.

The degree of residual crystallinity according to the present invention is determined by X-ray diffraction of a copolymer sample which has been subjected to cooling at a rate of 5° C. per hour from 190° C. to ambient temperature.

The geometric average molecular weight is defined according to the present invention by the mathematical relationship:

$$\log_{10} M_g = \sum_{i=1}^{i=N} W_i \log_{10} M_i$$

where $W_i$ is the weight fraction of the substance having the mass $M_i$ and N is the number of fractions eluted by gel permeation chromatography.

Copolymers of this type can be obtained especially by copolymerising, at a temperature of about 160° to 270° C. and under a pressure of about 400 to 850 bar, a gas stream comprising about 18 to 42% by volume of ethylene and 58 to 82% by volume of olefins (propylene + 1-butene) in the presence of a catalytic system of the Ziegler type comprising an organoaluminium activator and a transition metal compound from groups IVB, VB, VIB and VIII of the periodic table.

The propylene polymer usable in the thermoplastic composition having elastic memory according to the invention in a mixture with the ethylene/α-olefin copolymer can be a copolymer comprising at least 80 mol % of units derived from propylene and up to 20 mol % of units derived from ethylene or of an alpha-olefin having 4 to 8 carbon atoms.

In the context of the present invention, polynorbornene is understood to mean an amorphous polymer or copolymer of bicyclo[2.2.1]-2-heptene and substituted derivatives thereof, as described in U.S. Pat. No. 3,676,390. Of the plasticisers for polynorbornene which are capable of reducing its glass transition temperatures down to the range of rubbers, heavy aromatic, naphthenic or paraffinic oils derived from petroleum, and having freezing points below 0° C. and flashpoints above 180° C., and diesters of phthalic acid, such as dioctyl or didodecyl phthalates are suitable. These plasticisers can be used in pure form or as a mixture.

In order to improve the balance of the properties of the compositions according to the invention, it is advantageous to carry out the crosslinking of the polynorbornene, for example, by a dynamic vulcanisation process. The present invention therefore secondly relates to a thermoplastic composition having elastic memory and comprising a mixture of about 5 to 20 parts by weight of crosslinked polynorbornene, about 80 to 95 parts by weight of at least one polyolefin and an amount of plasticiser for polynorbornene sufficient for reducing its glass transition temperature down to the range of rubbers, characterised in that the polyolefin chosen is a composition comprising:

80 to 100% of at least one copolymer made of ethylene and of at least one alpha-olefin chosen from propylene and 1-butene, said copolymer having a relative density between about 0.850 and 0.890 and a flow index between about 0.3 and 15 dg/min, and 0 to 20% of at least one propylene polymer.

The ethylene/α-olefin copolymer present in the thermoplastic composition according to the invention has already been described above in detailed form with regard to the compositions comprising a non-crosslinked polynorbornene. In the thermoplastic compositions according to the invention, the plasticised crosslinked polynorbornene is advantageously present in the form of small dispersed particles, so that the composition can be processed and applied like any other thermoplastic material.

Any crosslinking system suited for vulcanising diene rubbers can be used for the crosslinking of polynorbornene in the thermoplastic compositions according to the invention. Of the crosslinking agents satisfactory for the rubbers, vulcanisation agents based on sulphur, peroxide, phenolic resin, or compounds of the formula:

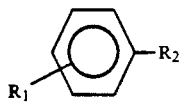 (I)

in which $R_1$ and $R_2$, identical or different, are chosen from $CH_nX_{3-n}$ radicals in which X is a halogen atom chosen from fluorine, chlorine and bromine, and n is an integer from 0 to 3, azo compounds, maleimide compounds, quinonoid and urethane compounds, such as, for example, free sulphur or sulphur-donating compounds, such as tetramethylthiuram disulphide, thiuram disulphide, benzothiazyl disulphide and dipentamethylenethiuram hexasulphide, or even m-phenylenebis(-maleimide), benzoquinone dioxime, lead peroxide, hexachloro-para-xylene, di-orthotolylguanidine, 4,4'-dithiodimorpholine and the like. These vulcanising agents can advantageously be used in combination with at least one vulcanisation activator or accelerator, such as zinc oxide, magnesium oxide, benzothiazolesulphonemide, tin chloride, zinc dibutyldithiocarbamate, zinc phenylethyldithiocarbamate, tellurium ethyldithiocarbamate, chlorosulphonated polyethylene and the like. When free sulphur or a sulphur-donating compound is used as vulcanising agent, it is preferable to use a large quantity of vulcanisation activator or accelerator, i.e., for example, a weight of activator or accelerator between about 1 and 3 times the weight of the vulcanising agent.

The constituents of the crosslinking system, and especially the vulcanising agent, are used in the usual proportions, which are known to one skilled in the art, for achieving almost complete crosslinking of the polynorbornene without however reducing its elasticity to a point where it is no longer rubber-like. When a compound of the formula (I), such as hexachloro-para-xylene, is the vulcanising agent, it is used in an amount of about 0.1 to 6% by weight, relative to the polynorbornene. In the thermoplastic compositions according to the invention, the polynorbornene is preferably crosslinked to a point where no more than 10%, preferably no more than 5%, of polynorbornene can be extracted with a solvent, such as boiling xylene, in which non-crosslinked polynorbornene is completely soluble as is the ethylene/α-olefin copolymer. This extraction test allows an en route verification of the fact that the ethylene/α-olefin copolymer itself has not been substantially crosslinked, which would have a detrimental effect on the thermoplasticity of the composition.

The properties of the compositions according to the invention can be advantageously modified for the needs of certain specific applications by adding conventional ingredients, such as:
    white pigments (titanium oxide) or colored pigments,
    coupling agents, such as silanes or titanates,
    anti-degradation agents, such as for example the zinc salt of mercaptobenzimidazole,
    stabilizers, such as, for example, polymerised 2,2,4-trimethyl-1,2-dihydroquinoline,
    processing aids, such as aliphatic long-chain amines, salts of stearic acid and the like,
    fillers in powder form, such as carbon black, silica, kaolin, alumina, clay, aluminosilicate, talc, carbonate, and
    lubricants, such as stearic acid.

The addition of fillers in powder form has in particular the effect of improving the tensile strength and in certain cases the elongation at break of the thermoplastic composition according to the invention. The amount of filler which can be incorporated in the composition can reach up to 150 parts per 100 parts by weight of the polynorbornene, this amount being of course variable according to the nature of the filler.

Finally, for applications in which a high resistance to ozone and/or to thermal ageing is desired, the compositions according to the invention can comprise an olefinic elastomer, which serves as partial replacement of the polynorbornene, so that the sum of the ethylene/α-olefin copolymer, the polynorbornene and the olefinic elastomer is equal to 100 parts by weight. As olefinic elastomer usable in the compositions according to the invention, an ethylene terpolymer with at least one α-olefin having 3 to 6 carbon atoms and at least one diene may be especially mentioned. More specifically, ethylene/propylene/diene terpolymers are preferred in which the diene is selected from linear or cyclic, conjugated or non-conjugated dienes, such as, for example, butadiene, isoprene, 1,3-pentadiene, 1,4-pentadiene, 1,4-hexadiene, 1,5-hexadiene, 1,9-decadiene, 5-methylene-2-norbornene, 5-vinyl2-norbornene, 2-alkyl-2,5-norbornadienes, 5-ethylidene2-norbornene, 5-(2-propenyl)-2-norbornene, 5-(5-hexenyl)-1,5-cyclooctadiene, bicyclo[2.2.2]octa-2,5-diene, cyclopentadiene, 4,7,8,9-tetrahydroindene and isopropylidenetetrahydroindene. Such elastomeric terpolymers usable according to the present invention in general comprise between 15 and 60 mol % of units derived from propylene and between 0.1 and 20 mol % of units derived from the diene.

The proportion of olefinic elastomer usable in the compositions according to the invention is in general such that it replaces up to one third of the weight of the polynorbornene present.

The thermoplastic compositions according to the invention in which the polynorbornene is crosslinked are preferably prepared by dynamic vulcanisation, i.e. by kneading a mixture of polynorbornene, plasticiser, ethylene/α-olefin copolymer and a crosslinking system (as defined above) at a temperature sufficiently high and over a period sufficiently long for crosslinking the polynorbornene. The kneading can be carried out in a conventional apparatus, such as, for example, a Banbury kneader, a Brabender kneader, a Rheocord kneader or an extruder, at a temperature between about 110° and 220° C. over a period between about 3 and 15 minutes, this period being less long the higher the temperature. Before this kneading step, the mixture can first be homogenised in an internal mixer at a moderate temperature between about 40° and 100° C.

Due to the particular measures which the present invention uses, it is possible to obtain products having:
    an elongation at break of at least about 600%,
    a 100% elongation set not exceeding about 32%,
    a compression set after 72 hours at 70° C. not exceeding about 80%, and
    a Shore A hardness not exceeding about 78.

More particularly, when the ethylene/alphaolefin copolymer has a relative density not exceeding 0.875, the present invention makes it possible to obtain materials having:
    a Shore A hardness not exceeding about 50 and
    a 100% elongation set not exceeding about 30%.

The compositions according to the invention can be used for manufacturing finished products and industrial goods by the extrusion, injection-moulding and compression-moulding methods or by any other technique suited to the processing of a thermoplastic material. Concrete applications of the compositions according to the invention comprise especially air-tight seals, footwear parts, flexible tubes, damping elements, profiles for the construction and automobile industries, and the like.

The examples below are given for non-limiting illustration of the present invention.

EXAMPLE 1 (COMPARATIVE)

In a first step, polynorbornene is formulated together with a plasticiser, a filler, an anti-degradation agent, a vulcanising agent, a pigment and a lubricant in an internal mixer rotating at rpm for 6 minutes, controlled at 80° C. and the formulation obtained is then made into a sheet by passing it over a cylindrical mixer controlled at 60° C. to which a vulcanisation accelerator is added. In a second step, a crystalline polyolefin is added to the rubber-like composition, and the mixture is transferred to a Brabender kneader rotating at 90 rpm at a temperature of 180° C. over a period of 8 minutes. The resulting composition is recovered and compression-moulded to give plates of 2.5 mm, on which the following properties are measured:

- Shore A hardness determined according to NFT Standard 51 109 (the figure shown in the table below for this example corresponds to a Shore D hardness)
- elongation at break (EB), expressed in % and determined according to NFT Standard 51 034, the measurement being carried out on an H3 test specimen at a drawing rate of 100 mm/min
- 100% elongation set (ES), expressed in % and determined according to NFT Standard NFT 51 034, the measurement being carried out on an ASTM micro-specimen at a drawing rate of 500 mm/min
- Mattia deflection, expressed in mm of notch after $10^5$ bendings and determined according to NFT Standard 51 016.

In this comparative example:

- the polyolefin is an ethylene/1-butene copolymer having a relative density 0.918, a flow index of 1.1 dg/min, a melting temperature of 122° C. and a crystallinity ratio of 35%, marketed by the applicant company under the name LOTREX,
- the polynorbornene used is marketed by the applicant company under the name NORSOREX,
- the plasticiser is a naphthenic oil marketed under the name PIONEER,
- the powdered filler is calcined kaolin,
- the vulcanising agent is a phenolic resin of the formula:

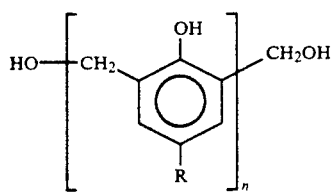

in which n is 4 or 5 and R denotes an alkyl radical, marketed by SCHENECTADY under the name SP 1045, and

- the vulcanisation accelerator is a mixture of zinc oxide, 1 part by weight of stannous chloride $SnCl_2 \times 2H_2O$ and 1 part by weight of magnesium oxide, the number of parts by weight present in the entire mixture being shown in the table below.

The amounts by weight of the various ingredients of the composition are shown in the table below, along with the results of the measurements of the properties carried out.

EXAMPLES 2 to 7

The procedure of Example 1 is repeated under the same conditions and using the same ingredients with the exception of the polyolefin, and different compositions whose properties are shown in the table below are prepared.

The polyolefin used in Examples 2 and 3 is a terpolymer comprising 84.6 mol % of units derived from ethylene, 6.7 mol % of units derived from propylene and 8.7 mol % of units derived from 1-butene and has a relative density of 0.881, a flow index equal to 1.2 dg/min, a crystalline melting temperature J of 107° C., a polydispersity index Mw/Mn of 4.7, a degree of residual crystallinity of 11% and a geometric average molecular weight of 65 kg/mole. This terpolymer was obtained under a pressure of 680 bar in a reactor having three zones whose temperatures gradually increase from 175° to 250° C. during the polymerisation of a mixture comprising 45% by volume of 1-butene, 17% by volume of propylene and 38% by volume of ethylene. The polyolefin used in Examples 5 and 6 is a mixture of this terpolymer, a propylene polymer marketed by HOECHST under the name HOSTALEN PPK 1032 and a master-batch (compound) comprising 40% of $\alpha,\alpha'$-bis(-tert.-butylperoxy)-m.p-diisopropylbenzene and 60% of ethylene/propylene//diene terpolymer, marketed under the name PEROXYMON F40MG.

The polyolefin used in Example 4 is a terpolymer comprising 78.9 mol % of units derived from ethylene, 11.6 mol % of units derived from propylene and 9.5 mol % of units derived from 1-butene, having a relative density of 0.871, a flow index equal to 2.6 dg/min, a polydispersity index of 4.7, a crystalline melting temperature J of 109° C., a degree of residual crystallinity of 6% and a geometric average molecular weight of 58 kg/mole. The polyolefin used in Example 7 is a mixture of this terpolymer, the polypropylene HOSTALEN PPK 1032 and the master-batch PEROXYMON F40MG.

Apart from the properties described in Example 1, the compression set (CS) after 72 hours at. 70° C., expressed in % and determined according to NFT Standard 46 011 by means of a specimen of type A, was measured for these compositions. Furthermore, for all these examples, the hardness is expressed in Shore A.

TABLE

|  | Example | | | | | | |
|---|---|---|---|---|---|---|---|
|  | 1 | 2 | 3 | 4 | 5 | 6 | 7 |
| Polynorbornene | 63 | 63 | 95 | 63 | 63 | 95 | 63 |
| Plasticiser | 94 | 94 | 141 | 94 | 94 | 141 | 94 |
| Filler | 25 | 25 | 38 | 25 | 25 | 38 | 25 |
| Vulcanising agent | 7 | 7 | 10 | 7 | 7 | 10 | 7 |
| Vulcanisation accelerator | 11 | 11 | 16 | 11 | 11 | 16 | 11 |
| Ethylene/α-olefin(s) copolymer | 800 | 800 | 700 | 800 | 700 | 600 | 700 |
| Polypropylene | 0 | 0 | 0 | 0 | 95 | 95 | 95 |
| Peroxymon | 0 | 0 | 0 | 0 | 5 | 5 | 5 |
| Shore A hardness | 33D | 73 | 71 | 28 | 77 | 75 | 43 |
| Elongation at break | 670 | 1200 | 890 | 810 | 1200 | 920 | 900 |
| ES | 57 | 30 | 24 | 20 | 32 | nd | 17 |

TABLE-continued

| | Example | | | | | | |
|---|---|---|---|---|---|---|---|
| | 1 | 2 | 3 | 4 | 5 | 6 | 7 |
| Mattia deflection | 25 | 3 | 3 | nd | 6 | 7 | 11 |
| CS | nd | nd | nd | nd | 79 | 78 | 64 | nd: not determined

What is claimed is:

1. Thermoplastic composition with elastic memory comprising a mixture of about 5 to 20 parts by weight of polynorbornene, about 80 to 95 parts by weight of at least one polyolefin and an amount of plasticiser for polynorbornene sufficient for reducing its glass transition temperature down to the range of rubbers, characterised in that the polyolefin chosen is a composition comprising:
   80 to 100% of at least one copolymer made of ethylene and at least one alpha-olefin chosen from propylene and 1-butene, said copolymer having a relative density between 0.850 and 0.890 and a flow index between 0.3 and 15 dg/min, and
   0 to 20% of at least one propylene polymer.

2. Thermoplastic composition with elastic memory comprising a mixture of about 5 to 20 parts by weight of crosslinked polynorbornene, 80 to 95 parts by weight of at least one polyolefin and an amount of plasticiser for polynorbornene sufficient for reducing its glass transition temperature down to the range of rubbers, characterised in that the polyolefin chosen is a composition comprising:
   80 to 100% of at least one copolymer made of ethylene and at least one alpha-olefin chosen from propylene and 1-butene, said copolymer having a relative density between 0.850 and 0.890 and a flow index between 0.3 and 15 dg/min, and
   0 to 20% of at least one propylene polymer.

3. Thermoplastic composition with elastic memory according to claims 1 or 2, characterised in that the ethylene/alpha-olefin copolymer comprises 9 to 23 mol % of at least one alpha-olefin chosen from propylene and 1-butene.

4. Thermoplastic composition according to claims 1 or 2, characterised in that it contains at least one olefinic elastomer in addition to said ethylene α-olefin copolymers, which serves as partial replacement of the polynorbornene, so that the sum of the ethylene/α-olefin copolymer, the polynorbornene and the olefinic elastomer is equal to 100 parts by weight.

5. Thermoplastic composition with elastic memory according to claim 3, characterised in that the ethylene/α-olefin copolymer has a crystalline melting temperature J between 100° C. and 125° C.

6. Thermoplastic composition with elastic memory according to claim 3, characterised in that the ethylene/α-olefin copolymer has a polydispersity index between 3.5 and 15.

7. Thermoplastic composition with elastic memory according to claim 3, characterised in that the ethylene/α-olefin copolymer has a geometric average molecular weight between 35 and 70 kg/mole.

8. Thermoplastic composition according to claim 2, characterised in that the polynorbornene is crosslinked to such an extent that not more than 10% of polynorbornene can be extracted with a solvent.

9. Thermoplastic composition according to one of claims 1 or 2, characterised in that it further comprises at least one additive chosen from white pigments or colored pigments, coupling agents, anti-degradation agents, stabilizers, processing aids, powdered fillers and lubricants.

10. Thermoplastic composition according to claim 9, characterised in that the said additive is a powdered filler employed in an amount of up to 150 parts by weight per 100 parts by weight of polynorbornene.

11. Process for the preparation of a thermoplastic composition according to claim 2, characterised in that a mixture of polynorbornene, plasticiser, ethylene/α-olefin copolymer and a crosslinking system is kneaded at a temperature sufficiently high and over a period sufficiently long for crosslinking the polynorbornene.

12. Process according to claim 11, characterised in that the kneading is carried out at a temperature between 110° and 220° C. over a period between 3 and 15 minutes.

13. Thermoplastic composition according to claim 4, characterized in that the added olefinic elastomer is an ethylene terpolymer containing at least one α-olefin and having 3 to 6 carbon atoms.

14. Thermoplastic composition according to claim 13, characterized in that the terpolymer has at least one diene unit.

* * * * *